Jan. 5, 1937. J. TRANK 2,066,749
UTENSIL
Filed Jan. 10, 1936

INVENTOR.
Joe Trank
BY
ATTORNEY.

Patented Jan. 5, 1937

2,066,749

UNITED STATES PATENT OFFICE 2,066,749

UTENSIL

Joe Trank, Los Angeles, Calif.

Application January 10, 1936, Serial No. 58,563

3 Claims. (Cl. 53—5)

This invention relates to utensils for use in the art of cooking and an object is to provide a culinary utensil composed of a pair of flat members preferably secured together at their margins and movable pivotally one relative to the other so as to receive and hold strips of bacon, slices of meat, cakes or other flat articles of food during a cooking operation whereby the articles may be turned in a skillet so as to uniformly cook both sides thereof.

Another object is to provide a utensil of the character described which is adapted to rest flatwise in a skillet and submerged in grease during a frying operation, and to provide a handle on each side of the utensil which is hingedly mounted and arranged so that both of the handles will normally rest in adjacent planes and may be grasped together for the purpose of lifting and turning the utensil in the skillet.

Briefly described my improved utensil comprises a pair of preferably circular perforated members marginally hinged together and having similar handles hinged thereto at adjacent points diametrically opposite the hinge which connects said members, the peripheries of said members being recessed so as to permit the handle of the opposite member to be extended upwardly or downwardly through the recesses, for the purpose hereinafter described.

I have shown a preferred form of utensil embodying my improvements in the accompanying drawing, subject to modification, within the scope of the appended claims, without departing from the spirit of my invention. In said drawing:

Figure 1:
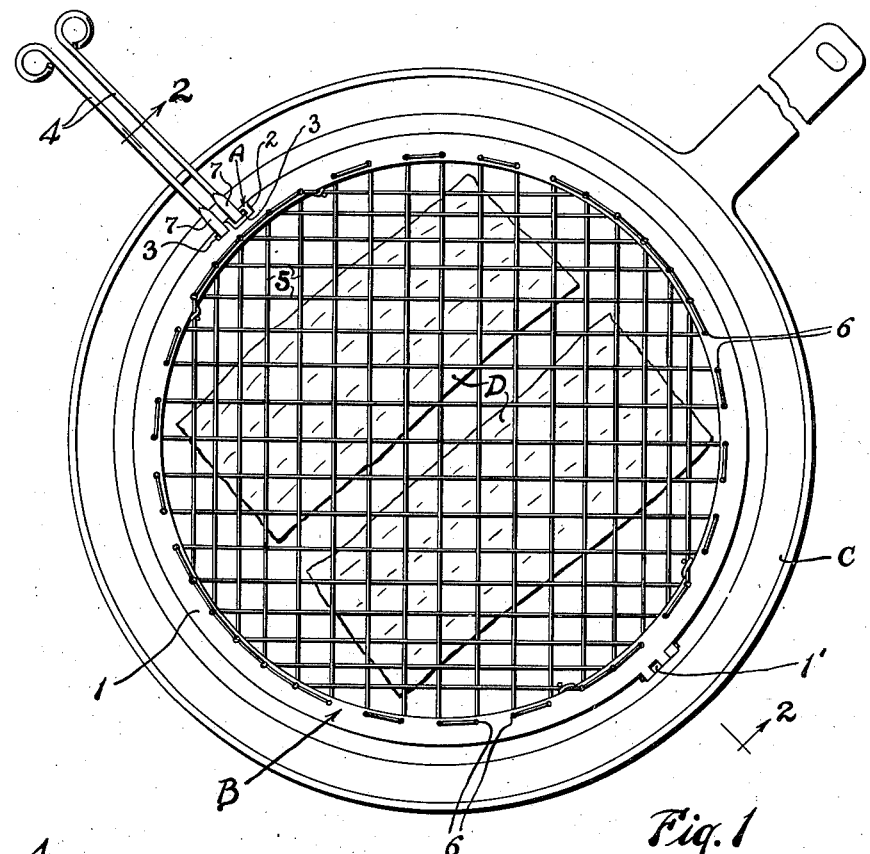
Fig. 1 is a plan view of my utensil held in the bottom of a skillet.
Figure 3:
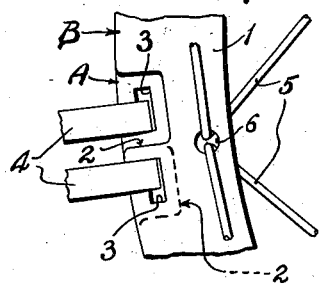
Fig. 3 is a fragmentary view showing a manner of mounting the handles on the utensil.

The utensil embodies two main members A and B of similar form and size, preferably circular and perforated, as shown in Fig. 1. Said members have similar annular portions 1 which are marginally hinged together at 1' and at points substantially diametrically opposite said hinge the portions 1, 1, are peripherally recessed at 2, 2, at staggered positions, as shown in Fig. 3. Portions 1 are also perforated at 3 so as to provide elongated slots for hingedly receiving handles 4 of flat cross section. Thus said handles are pivotally held on the members A and B but are prevented from rotation in the slots 3.

The central portions of members A and B may be perforated when the same are formed of a single sheet of material, or as shown in Fig. 1, they may be formed with wire, as at 5, laced through perforations 6, or otherwise. The purpose of the wired or perforated central portions is to expose as much of an article D held between the members A and B to the grease within the skillet C, or to heat of a burner when the utensil is used as a broiler.

Figure 2:
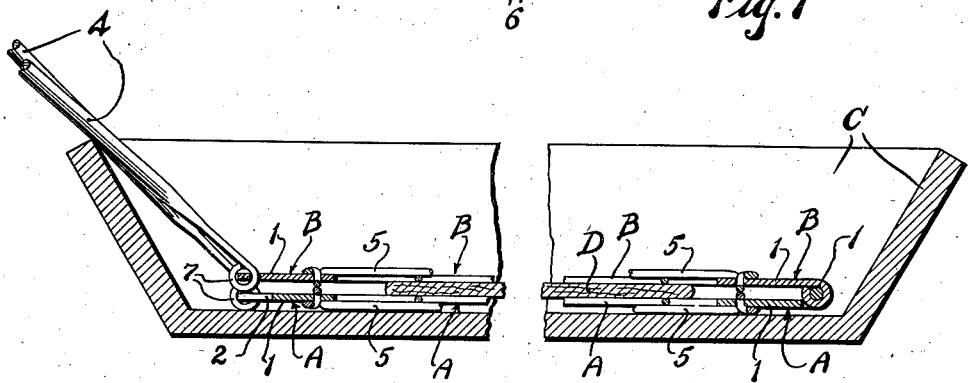
Fig. 2 is a section thereof on line 2—2 of Fig. 1.

When articles D are held flatwise between the two hinged members A and B in a skillet the handles 4 will extend upwardly and rest against the side of the skillet, as shown in Fig. 2, where they are accessible for lifting the utensil bodily from the skillet, after which it may be turned and again deposited in the skillet. In such case, the handle on the lowermost member will extend upwardly through the recess 2 in the upper member while the handle will hinge on the portions 1 by means of their loops 7. Both handles, of course, are grasped at the same time for lifting and turning the utensil.

Having thus described my utensil, what I claim as my invention and desire to secure by Letters Patent, is:

1. A utensil comprising: a pair of perforate flat members hingedly connected at marginal points and adapted to hold flat articles therebetween, and handles hinged to said members at adjacent points, for lifting and reversing the position of said members, each of said members being recessed on its periphery at a point in the path of movement of the handle of the other member so as to permit the extension of the handles of each member into the recess of the other member.

2. A utensil comprising: a pair of perforate members of like size superposed one upon the other and hinged together at a marginal point, and handles pivotally held on the peripheries of said members in adjacent positions and adapted to be swung on horizontal axes to positions above and below said members, each of said members having a marginal recess and a slot, the slot of each member being in registration with the recess of the other member, and pivot portions on said handles extending through said slots.

3. A utensil comprising: a pair of circular perforate members of like size superposed one upon the other and hinged together at a marginal point, and handles pivotally held on the peripheries of said members in adjacent positions and adapted to be swung on horizontal axes to positions above and below said members, said handles having attaching loops of flat cross section, said members having elongated slots for receiving said loops, whereby said handles are prevented from turning except on said horizontal axes.

JOE TRANK.